United States Patent
Müller et al.

(10) Patent No.: US 8,925,908 B2
(45) Date of Patent: Jan. 6, 2015

(54) SPRING, IN PARTICULAR FOR A LOCKING DEVICE OF A VEHICLE SEAT

(75) Inventors: Peter Müller, Mackenback (DE); Volker Windecker, Sippersfeld (DE)

(73) Assignee: Johnson Controls Components GmbH & Co. KG., Kaiserslautern (DE)

( * ) Notice: Subject to any disclaimer, the term of this patent is extended or adjusted under 35 U.S.C. 154(b) by 84 days.

(21) Appl. No.: 13/144,147

(22) PCT Filed: Dec. 5, 2009

(86) PCT No.: PCT/EP2009/008700
§ 371 (c)(1),
(2), (4) Date: Jul. 12, 2011

(87) PCT Pub. No.: WO2010/085997
PCT Pub. Date: Aug. 5, 2010

(65) Prior Publication Data
US 2011/0266730 A1    Nov. 3, 2011

(30) Foreign Application Priority Data
Jan. 29, 2009  (DE) .......................... 10 2009 007 050

(51) Int. Cl.
*F16F 1/06*    (2006.01)
*F16F 1/04*    (2006.01)
*B60N 2/44*    (2006.01)

(52) U.S. Cl.
CPC .. *B60N 2/442* (2013.01); *F16F 1/04* (2013.01)
USPC ........... 267/180; 267/155; 267/166; 267/286; 297/354.1; 297/313

(58) Field of Classification Search
USPC .............. 267/286, 288, 289, 290, 166, 166.1, 267/167, 180; 297/313, 354.1, 362, 365, 297/367
See application file for complete search history.

(56) References Cited

U.S. PATENT DOCUMENTS

| | | | |
|---|---|---|---|
| 274,715 A | 3/1883 | Buckley | |
| 276,805 A * | 5/1883 | Guild | ............................ 251/337 |

(Continued)

FOREIGN PATENT DOCUMENTS

| | | |
|---|---|---|
| CH | 699 955 A1 | 5/2010 |
| DE | 40 00 086 A1 | 7/1990 |

(Continued)

OTHER PUBLICATIONS

Meissner M.: "Zur Korrektur der wirksamen Windungszahl von Schrauben-druckfedern": Draht, Meisenbach, Baumberg, DE, vol. 46, No. 10, Oct. 1, 1995, pp. 496-500.

*Primary Examiner* — Thomas Irvin
(74) *Attorney, Agent, or Firm* — McGlew and Tuttle, P.C.

(57) ABSTRACT

A spring (10), for a locking device of a vehicle seat, is designed as a yoke spring defining an axis (A) and made of a spring wire. A cross section diameter (q) has one leg (10a) on each of both ends of the spring wire. The two legs (10a) can pivot relative to each other in a circumferential direction of the axis (A), thereby transitioning the spring (10) from a relaxed state into a tensioned state. At least one first winding (10b) is provided between the legs (10a) that is wound completely around the axis (A) and having a winding diameter (di) in the relaxed state. At least one adjacent second winding (10b) is provided between the legs (10a) and disposed offset along by the axis (A) by a pitch (h), wherein the second winding (10b) may optionally be wound not fully about the axis (A). The second winding (10b) has a winding diameter (d2) in the relaxed state. The pitch (h) is less than the cross section diameter (q).

20 Claims, 3 Drawing Sheets

%%END%%

(56) References Cited

U.S. PATENT DOCUMENTS

| | | | |
|---|---|---|---|
| 2,250,042 A * | 7/1941 | Sundt et al. | 267/166.1 |
| 2,456,302 A * | 12/1948 | Mocnik | 248/468 |
| 2,524,293 A * | 10/1950 | Lindstrom | 267/180 |
| 2,616,684 A * | 11/1952 | Richter | 267/166.1 |
| 2,668,278 A * | 2/1954 | Avery | 439/384 |
| 2,766,983 A * | 10/1956 | Taylor | 267/180 |
| 2,852,801 A * | 9/1958 | Doljan | 16/85 |
| 3,345,079 A * | 10/1967 | Wickham | 279/19.6 |
| 3,430,275 A * | 3/1969 | Janapol | 267/167 |
| 4,077,619 A * | 3/1978 | Borlinghaus | 267/166.1 |
| 4,160,544 A * | 7/1979 | Higgins | 267/166.1 |
| 4,778,162 A * | 10/1988 | Borlinghaus | 267/248 |
| 5,540,117 A | 7/1996 | Hansel et al. | |
| 5,575,460 A * | 11/1996 | Knopfel | 267/91 |
| 6,481,701 B2 * | 11/2002 | Kessen et al. | 267/166 |
| 7,044,552 B2 | 5/2006 | Mueller et al. | |
| D530,120 S * | 10/2006 | Eigenmann et al. | D6/504 |
| 7,386,897 B2 * | 6/2008 | Eigenmann et al. | 5/248 |
| D574,168 S * | 8/2008 | Eigenmann et al. | D6/504 |
| 7,921,561 B2 * | 4/2011 | Eigenmann et al. | 29/896.92 |
| 2003/0034599 A1* | 2/2003 | Devambe | 267/166 |
| 2006/0042016 A1 | 3/2006 | Barman et al. | |
| 2008/0017255 A1* | 1/2008 | Petersen | 137/522 |
| 2010/0171351 A1 | 7/2010 | Thiel et al. | |

FOREIGN PATENT DOCUMENTS

| | | |
|---|---|---|
| DE | 44 39 644 A1 | 6/1995 |
| DE | 195 06 422 A1 | 8/1996 |
| DE | 103 04 574 B4 | 8/2004 |
| DE | 10 2004 040 632 B3 | 1/2006 |
| DE | 10 2006 044489 A1 | 8/2007 |
| JP | 61 228134 A | 10/1986 |
| WO | 2006/026997 A1 | 3/2006 |
| WO | 2009/008655 A2 | 1/2009 |

* cited by examiner

SPRING, IN PARTICULAR FOR A LOCKING DEVICE OF A VEHICLE SEAT

CROSS REFERENCE TO RELATED APPLICATIONS

This application is a United States National Phase application of International Application PCT/EP2009/008700 and claims the benefit of priority under 35 U.S.C. §119 of German Patent Application DE 10 2009 007 050.8 filed Jan. 29, 2009, the entire contents of which are incorporated herein by reference.

FIELD OF THE INVENTION

The invention relates to a spring, in particular for a locking device of a vehicle seat, which is constructed from a spring wire, with a cross-sectional diameter, in the form of a leg spring, defining an axis and having a leg at each of the two ends of the spring wire, the two legs being pivotable relative to each other in the circumferential direction of the axis and, as they pivot, cause the spring to pass from a relaxed state into a tensioned state.

BACKGROUND OF THE INVENTION

A wide variety of springs are known. A known spring of the type mentioned in the introduction is a leg spring having two legs and several windings there between which are wound with a constant winding diameter around an axis, adjacent windings being arranged offset relative to each other along the axis by the pitch. The leg spring is tensioned by pivoting the two legs relative to each other about the axis. Accordingly, the built up pretensioning acts in the circumferential direction. Leg springs are especially preferred when the dimension along the axis is to remain constant and the installation space in the radial direction is limited. In order to build up pretensioning in the circumferential direction, it is also possible to use a spiral spring in the case of which all of the windings are laid inside each other in the form of a spiral with a continuously changing winding diameter. Spiral springs are especially preferred when the installation space is greatly limited in the axial direction but is sufficiently available in the radial direction.

SUMMARY OF THE INVENTION

An object of the invention is to improve a spring of the type mentioned in the introduction.

According to the invention, a spring is provided, in particular a spring for a locking device of a vehicle seat. The spring comprises a spring wire in the form of a leg spring, defining an axis and with a cross-section having a cross-sectional diameter. A leg is at each of two ends of the spring wire to provide two legs. The two legs are pivotable relative to each other in the circumferential direction of the axis. As the two legs pivot, the spring passes from a relaxed state into a tensioned state. At least a first winding with a first winding diameter, in the relaxed state, extends completely around the axis. At least an adjacent second winding has a second winding diameter, in the relaxed state. The adjacent second winding is arranged offset by a pitch along the axis and extends one of completely and incompletely around the axis. The pitch in the relaxed state is smaller than the cross-sectional diameter.

With regard to the installation space, the spring constructed in accordance with the invention combines the advantages of a leg spring with the advantages of a spiral spring, so that, overall, there is only a small installation-space requirement. The reduction in the pitch and thus in the overall axial dimension can be achieved by adjacent windings having different winding diameters. In the case of, for example, two different winding diameters, in each case the next but one windings come into abutment with each other, so that the pitch can be reduced to half the cross-sectional diameter. In the case of three windings, preferably the middle winding has a smaller winding diameter.

The invention is explained in more detail hereinafter with reference to an exemplary embodiment shown in the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
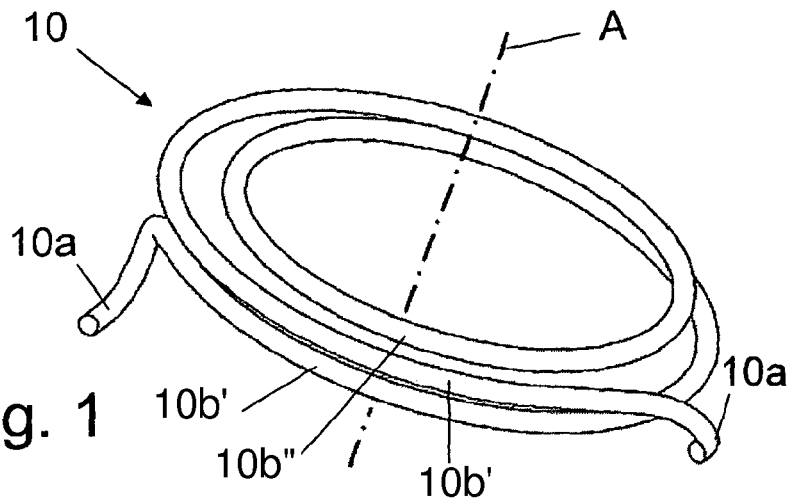
FIG. 1 is a perspective view of the exemplary embodiment according to the intention.
Figure 2:
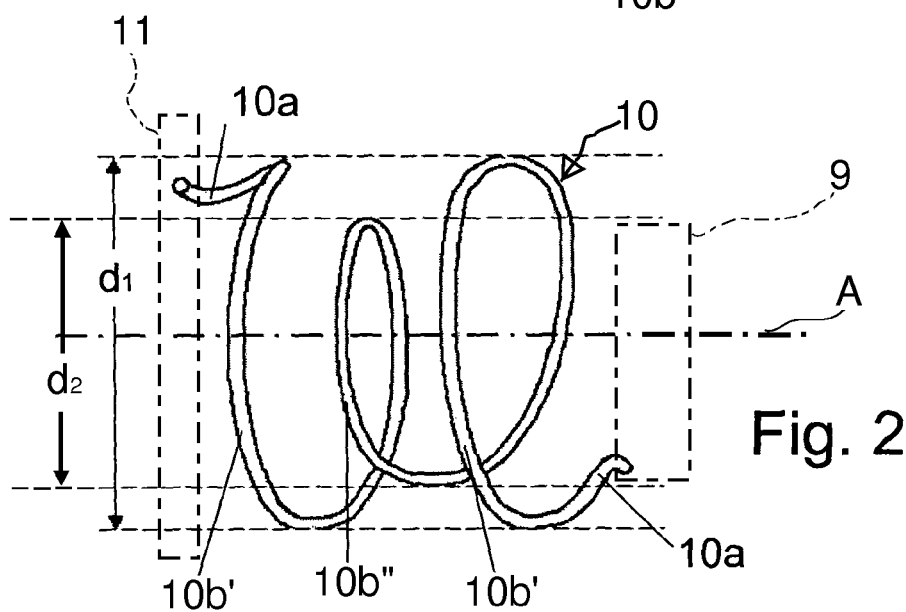
FIG. 2 is a view of the exemplary embodiment pulled apart along the axis A.

Referring to the drawings in particular, a vehicle seat 201 for a two-door motor vehicle has in each case a fitting/locking device 205 on its two sides for setting the inclination and for the free pivoting of its backrest 202 in relation to its seat part 203. The locking device 205 for the vehicle seat 201 has a member 11, such as a movable detent and a counter-member 9 cooperating with the detent in the locked state. In the locked state, the detent is secured by at least one securing member. It is also possible to provide two securing members, namely a pretensioned tensioning eccentric which, in a normal case, acts on the detent with an eccentrically curved face outside the self-locking range, and an intercepting component which, in the event of a crash, supports the detent, which is moving slightly in the opening direction owing to an opening moment, by abutting the detent inside the self-locking range, so that the detent cannot transmit an opening moment. Such locking devices 205 are described, for example, in DE 44 39 644 A1, DE 103 04 574 B4 and DE 10 2006 044 489 A1, the relevant disclosures of which are expressly incorporated herein (corresponding/related U.S. Pat. Nos. 5,540,117, 7,044,552 and U.S. Patent Application Publication US 2010/0171351 are incorporated by reference in their entirety).

A spring 10 is in the present case provided for pretensioning the member 11 which is the securing member of the locking device, to be more precise, for pretensioning the tensioning eccentric. The spring 10 is constructed from a spring wire having, in the present case, a constant cross-section. The cross-section is in the present case circular with a diameter which is referred to hereinafter as the cross-sectional diameter q. In embodiments having non-circular cross-sections, the cross-sectional diameter q is to correspond to the dimension of the cross-section parallel to the axis A.

Figure 4:
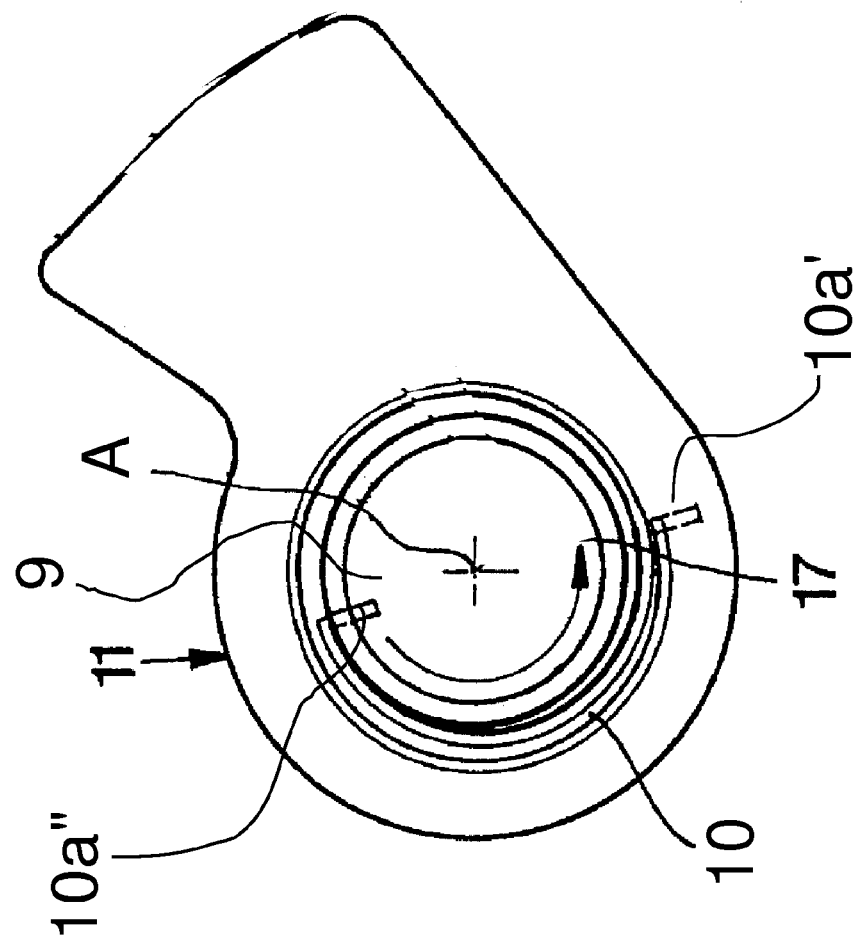
FIG. 4 is view of the member and counter-member connected to the spring.
Figure 5:
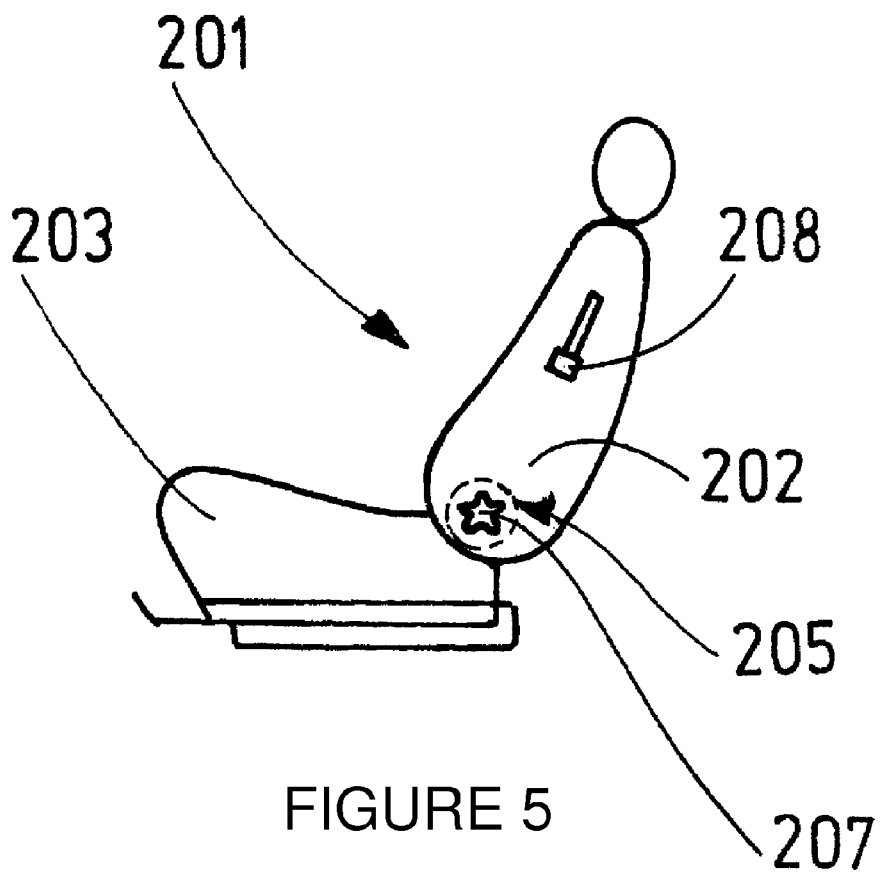
FIG. 5 is a diagrammatic side view of a vehicle seat.

The spring 10 is in the form of a leg spring, that is to say, the spring 10 has at its ends two legs 10a' and 10a". The leg 10a' is connected, or inserted into, to the member 11, and the leg 10a" is connected, or inserted into, to the counter member 9, as shown in FIG. 4 and further described in detail in U.S. Pat. No. 5,540,117 which has been incorporated by reference. In between the two legs 10a' and 10a" there are provided at least a first winding 10b', which is wound completely around the axis A, and at least an adjacent second winding 10b" which is wound optionally incompletely around the axis A and which is arranged offset along the axis A. The first and second windings 10b' and 10b" are not shown in FIG. 4 for the sake of clarity. The axis A defines the directional information used in the present case. The legs 10a project from the windings 10b, for example, tangentially, radially or parallelly with respect to the axis A. In the present case, two complete windings 10b and one incomplete winding 10b are formed, that is to say, two windings 10b are present over one portion of the circumference of the spring 10 and three windings 10b are present over the other portion of the circumference. The windings 10b are wound in the form of a circle around the axis A, the diameters being different in the present case. In the region of the three windings 10b, the two outer (first and third) windings 10b have a winding diameter d1 in the direction radial to the axis A, while the middle (second) winding has a winding diameter d2 which is smaller by at least the cross-sectional diameter q, preferably by at least twice the cross-sectional diameter q, than d1, that is to say $$d2 \leq d1 - q.$$

It is therefore possible to arrange the windings 10b more densely along the axis A. The distance between two windings 10b by which the windings 10b are offset relative to each other along the axis A, that is to say, the pitch (or lead) h, can then be smaller than the cross-sectional diameter q (h<q). With exactly two different winding diameters d1, d2 which alternate in the case of the windings 10b, in each case the next but one windings can thus come into abutment with each other. With a regular spatial distribution of the windings 10b along the axis A, the pitch h can be reduced to half the cross-sectional diameter q, so that the following applies:

$$\tfrac{1}{2}q \leq h < q$$

Figure 3:
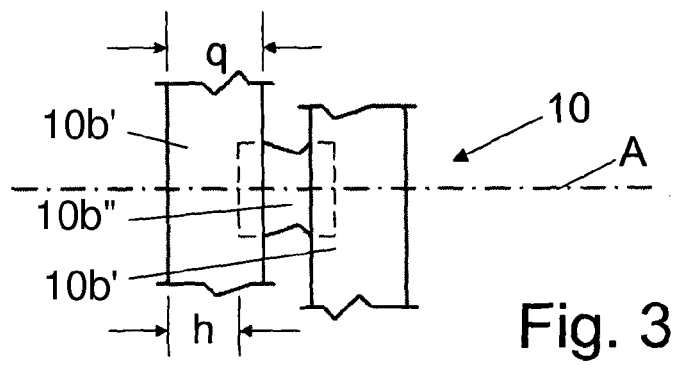
FIG. 3 is a partial view of the exemplary embodiment observed perpendicularly to the axis A.

With three different winding diameters, the pitch h can be reduced to one third of the cross-sectional diameter q, etc. As shown in FIG. 3, the pitch h is the distance between corresponding points on adjacent windings 10b of the spring 10.

While specific embodiments of the invention have been described in detail to illustrate the application of the principles of the invention, it will be understood that the invention may be embodied otherwise without departing from such principles.

The invention claimed is:

1. A locking device of a vehicle seat, the locking device including a spring assembly, the spring assembly comprising:
   a securing member cooperating with the locking device of the seat;
   a spring wire in the form of a leg spring, defining an axis, wherein the spring wire has a cross-section having a cross-sectional diameter, said spring wire pretensioning said securing member;
   a leg at each of two ends of the spring wire to provide two legs, the two legs being pivotable relative to each other in the circumferential direction of the axis and, as the two legs pivot, the spring passes from a relaxed state into a tensioned state,
   at least a first winding with a first winding diameter, in the relaxed state, is wound completely around the axis;
   at least an adjacent second winding with a second winding diameter in the relaxed state, is arranged offset by a pitch along the axis and is wound one of completely and incompletely around the axis; wherein
   the pitch in the relaxed state is smaller than the cross-sectional diameter, wherein, for the pitch (h) in the relaxed state and the cross-sectional diameter (q) of said spring wire, the following applies: $\tfrac{1}{2}q \leq h \leq q$.

2. A spring according to claim 1, wherein the first winding diameter and the second winding diameter are different.

3. A spring according to claim 2, wherein the second winding diameter is smaller than the first winding diameter by at least twice the cross-sectional diameter.

4. A spring according to claim 1, wherein three windings are provided, one of which extends one of completely and incompletely around the axis.

5. A spring according to claim 4, wherein a winding diameter of a middle winding of the three windings is smaller than winding diameters of outer windings of the three windings.

6. A spring according to claim 1, wherein several windings are provided, the winding diameters of which are alternately larger and smaller in the relaxed state.

7. A spring according to claim 1, wherein, with respect to the axis, the legs project radially or parallel to the axis of the windings.

8. A spring assembly in accordance with claim 1, wherein:
   said securing member is connected to one of said legs;
   a counter member is connected to another one of said legs, said counter member also being adapted to cooperate with the locking device of the seat, said member and said counter member being rotatably connected to each other in said circumferential direction of said axis, said first and second windings pass from a relaxed state into a tensioned state as said member and said counter member rotate relative to each other.

9. A spring assembly in accordance with claim 1, wherein:
   another first winding is formed in said spring wire;
   said second winding is arranged between said first winding and said another first winding;
   an axial distance between said first winding and said another first winding in said relaxed state is less than said cross sectional diameter of said spring wire.

10. A locking device of a vehicle seat, the locking device including a leg spring assembly, the assembly comprising:
   a securing member cooperating with the locking device of the seat;
   a spring wire having a cross-sectional diameter, said spring wire pretensioning said securing member;
   a leg at each of two ends of the spring wire to provide two legs, the two legs being pivotable relative to each other in a circumferential direction of the axis between a relaxed state and a tensioned state;
   a first winding with a first winding diameter, in the relaxed state, the first winding being wound completely around the axis;
   a second winding with a second winding diameter, in the relaxed state, the second winding being arranged offset from the first winding by a pitch along the axis and, the second winding being wound one of completely and incompletely around the axis, wherein:
   the pitch, in the relaxed state, is smaller than the cross-sectional diameter of said spring wire, wherein, for the pitch (h) in the relaxed state and the cross-sectional diameter (q), the following applies: $\tfrac{1}{2}q \leq h \leq q$.

11. A spring assembly according to claim 10, wherein the second winding diameter is smaller than the first winding diameter by at least twice the cross-sectional diameter.

12. A spring assembly according to claim 10, wherein three windings are provided.

13. A spring assembly according to claim 12, wherein the second winding is a middle winding of the three windings.

14. A spring assembly in accordance with claim 10, wherein:
said securing member is connected to one of said legs;
a counter member is connected to another one of said legs, said counter member also being adapted to cooperate with the locking device of the seat, said member and said counter member being rotatably connected to each other in said circumferential direction of said axis, said first and second windings pass from a relaxed state into a tensioned state as said member and said counter member rotate relative to each other.

15. A spring assembly in accordance with claim 10, wherein:
another first winding is formed in said spring wire;
said second winding is arranged between said first winding and said another first winding;
an axial distance between said first winding and said another first winding in said relaxed state is less than said cross sectional diameter of said spring wire.

16. A locking device of a vehicle seat, the locking device including a spring assembly, the assembly comprising:
a spring wire having a cross-sectional diameter;
a first set of windings formed in said spring wire around a spring axis, said first windings having a first diameter in a relaxed state;
a second winding formed in said spring wire around said spring axis, said second winding being arranged between two of said first windings, said second winding having a second diameter in said relaxed state, said second diameter being smaller than said first diameter;
an axial distance between said two first windings in said relaxed state being less than said cross sectional diameter of said spring wire;
a leg arranged at each end of said spring wire;
a member connected to one of said legs, said member cooperating with the locking device of the vehicle seat;
a counter member connected to another one of said legs and also cooperating with the locking device of the vehicle seat, said member and said counter member being rotatably connected to each other about said spring axis to cooperate with operation of the locking device of the vehicle seat, said first and second windings pass from a relaxed state into a tensioned state as said member and said counter member rotate relative to each other.

17. A spring assembly in accordance with claim 16, wherein:
said second diameter is smaller than a winding diameter of said two first windings;
said two first windings are axially offset from each other.

18. A spring assembly in accordance with claim 16, wherein:
said member is a securing member adapted to cooperate with the locking device of the vehicle seat;
said first and second windings rotationally bias said securing member to cooperate with operation of the locking device of the vehicle seat.

19. A spring assembly in accordance with claim 18, wherein:
said securing member secures a detent of the locking device.

20. A spring assembly in accordance with claim 18, wherein:
said securing member is a tensioning eccentric adapted to cooperate with the locking device of the vehicle seat.

* * * * *